(12) United States Patent
Ross et al.

(10) Patent No.: US 11,080,114 B2
(45) Date of Patent: Aug. 3, 2021

(54) CONTROLLING INTERACTION WITH A SCALABLE APPLICATION

(71) Applicant: INTERNATIONAL BUSINESS MACHINES CORPORATION, Armonk, NY (US)

(72) Inventors: Martin A. Ross, Gosport (GB); Jack William Donato Evans, Hursley (GB); Luke James Powlett, Henley-in-Arden (GB); Jack Richard William Stevenson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/696,300

(22) Filed: Nov. 26, 2019

(65) Prior Publication Data

US 2021/0157661 A1   May 27, 2021

(51) Int. Cl.
*G06F 3/00* (2006.01)
*G06F 9/54* (2006.01)

(52) U.S. Cl.
CPC .................... *G06F 9/547* (2013.01)

(58) Field of Classification Search
CPC .................... G06F 9/54; G06F 9/541
USPC .................................. 719/310, 328
See application file for complete search history.

(56) References Cited

U.S. PATENT DOCUMENTS

| | | | |
|---|---|---|---|
| 6,889,254 B1* | 5/2005 | Chandra | G06F 16/2471 709/224 |
| 7,493,380 B2 | 2/2009 | Aman | |
| 9,239,851 B1* | 1/2016 | Messer | G06F 16/278 |
| 9,804,949 B2 | 10/2017 | Krajec | |
| 9,971,675 B2 | 5/2018 | Lincoln | |
| 10,178,031 B2 | 1/2019 | Krajec | |
| 10,642,663 B2 | 5/2020 | Harris | |
| 2003/0023669 A1 | 1/2003 | DeLima | |
| 2005/0066327 A1 | 3/2005 | Dettinger | |
| 2007/0300240 A1 | 12/2007 | Viegener | |
| 2008/0026312 A1 | 1/2008 | Kamiyoshi | |
| 2008/0028086 A1* | 1/2008 | Chetuparambil | G06F 9/5055 709/230 |
| 2008/0263212 A1* | 10/2008 | Goix | H04L 65/1096 709/228 |
| 2009/0240664 A1* | 9/2009 | Dinker | G06F 16/27 |
| 2009/0259736 A1 | 10/2009 | Chang | |
| 2010/0250648 A1 | 9/2010 | Cao | |
| 2011/0208876 A1 | 8/2011 | Richardson | |

(Continued)

OTHER PUBLICATIONS

N.J. Belkin, Combining the Evidence of Multiple Query Representations for Information Retrieval. (Year: 1995).*

(Continued)

*Primary Examiner* — Lechi Truong
(74) *Attorney, Agent, or Firm* — L. Jeffrey Kelly

(57) ABSTRACT

Concepts for controlling interaction with a scalable application are presented. An example includes registering an interface specification to an application, wherein metadata is associated with the interface specification. The method then includes routing a request to instances of the application based on the metadata associated with the interface specification for the application, then combining one or more responses from the instances of the application to form an aggregate response based on the metadata associated with the interface specification for the application.

20 Claims, 7 Drawing Sheets

(56) References Cited

U.S. PATENT DOCUMENTS

| | | | | |
|---|---|---|---|---|
| 2011/0296512 | A1* | 12/2011 | Dietrich | H04L 63/0853 726/9 |
| 2014/0019985 | A1 | 1/2014 | Krajec | |
| 2014/0372550 | A1 | 12/2014 | Said | |
| 2015/0222548 | A1 | 8/2015 | Krajec | |
| 2016/0007951 | A1 | 1/2016 | Haugaard | |
| 2016/0070593 | A1 | 3/2016 | Harris | |
| 2016/0191363 | A1* | 6/2016 | Haraszti | H04L 67/2842 709/223 |
| 2017/0286268 | A1 | 10/2017 | Lincoln | |
| 2018/0039671 | A1* | 2/2018 | Yang | G06F 16/256 |
| 2018/0225575 | A1 | 8/2018 | Sun | |
| 2018/0278675 | A1 | 9/2018 | Thayer | |
| 2020/0050694 | A1* | 2/2020 | Avalani | G06F 16/285 |

OTHER PUBLICATIONS

Hoang Tam Vo, LogBase: A Scalable Logstructured Database System in the Cloud (Year: 2012).*

Cloud Foundry, "HTTP Routing", Cloud Foundry Docs, https://docs.cloudfoundry.org/concepts/http-routing.html, 7 pages, accessed Nov. 18, 2019.

Mell et al., "The NIST Definition of Cloud Computing", National Institute of Standards and Technology, Special Publication 800-145, Sep. 2011, 7 pages.

Belkin et al., "Combining the evidence of multiple query representations for information retrieval", ScienceDirect, vol. 31, Issue 3, May-Jun. 1995, 3 pages.

Datadog, "Getting started with tags," Datasheet [online], Datadoghq.com, [accessed on Dec. 18, 2020], 3 pages, Retrieved from the Internet: <URL: https://docs.datadoghq.com/getting_started/tagging/>.

HTTP Routing, Cloud Foundry, Datasheet [online], Oct. 1, 2020 [accessed on Oct. 15, 2020], 6 pages, Retrieved from the Internet: <URL: https://docs.cloudfoundry.org/concepts/http-routing.html>.

IBM: List of IBM Patents or Patent Applications Treated as Related (Appendix P), Dec. 21, 2020, 2 pages.

Opentracing, "Instrumenting frameworks," Datasheet [online], opentracing.com, [accessed on Dec. 18, 2020], 10 pages, Retrieved from the Internet: <URL: https://opentracing.io/docs/best-practices/instrumenting-frameworks/#finish-the-span>.

Pending U.S. Appl. No. 17/247,615, entitled: " Coordinating Requests Actioned at a Scalable Application", filed Dec. 18, 2020, 48 pages.

Ross, et al., "Controlling Interaction With a Scalable Application," Application and Drawings, Filed on Nov. 23, 2020, 29 Pages, Related PCT Patent Application Serial No. IB2020/061039.

Notification of Transmittal of the International Search Report and the Written Opinion of the International Searching Authority, or the Declaration, dated Feb. 25, 2021, File reference P201809114, International application No. PCT/IB2020/061039, 11 pages.

\* cited by examiner

CONTROLLING INTERACTION WITH A SCALABLE APPLICATION

BACKGROUND

The present invention relates generally to interaction with a scalable application, and more particularly to controlling interaction with a scalable application.

The present invention also relates to a computer program product including computer-readable program code that enables a processor of a system, or a number of processors of a network, to implement such a method.

The present invention further relates to a computer system including at least one processor and such a computer program product, where the at least one processor is adapted to execute the computer-readable program code of the computer program product.

The present invention also relates to a system for controlling interaction with a scalable application.

Many traditional computer application platforms enable microservice architectures where an application, or a component of an application, can be deployed and scaled independently of the rest of the system. These application platforms may be cloud-based (i.e. available to users on demand via the Internet from a cloud computing provider's servers), and may further enable the use of more than one cloud platform that each delivers a specific application service (i.e. a multi-cloud application platform). Microservices thus enable an application to be structured as a collection of loosely-coupled services. In traditional microservice architectures, an application is decomposed into different smaller services, which improves the architecture modularity.

For applications of a platform as described above, a workload balancer is typically implemented in front of the instances (i.e. replicas) of the applications. The workload balancer routes traffic between the instances (e.g. traffic is distributed consecutively between the instances such that each instance receives the traffic).

Using a workload balancer is beneficial for runtime workload. However, an issue arises for commands (e.g. collecting a trace), as the commands are routed to only one of the instances of the application. Traditional multi-cloud application platforms provide the ability to send Hypertext Transfer Protocol (HTTP) requests (i.e. a packet of information that one computer sends to another computer to communicate) to a specific instance of an application or to implement a workload balancer to distribute the requests consecutively between the application instances. As a result, the rate at which the requests can be distributed is limited, and consequently the efficiency of the application platform suffers.

For example, capturing a trace from an instance of a typical scalable application involves issuing a command to start the trace by sending a corresponding HTTP request. The request is routed to one instance of the application via a workload balancer (e.g. a router component). The issue is then identified and a command to stop the trace is sent. However, the command to stop the trace may be routed to a different instance of the application. In this scenario, the trace is retrieved from the instance without having captured the issue/event. As a result, the issue was identified but the error occurred on an instance different to the instance that was traced.

SUMMARY

The present invention seeks to provide a computer-implemented method for controlling interaction with a scalable application.

The present invention further seeks to provide a computer program product including computer program code for implementing a proposed method when executed by a processing unit.

The present invention also seeks to provide a processing system adapted to execute this computer program code.

The present invention also seeks to provide a system for controlling interaction with a scalable application.

According to an aspect of the present invention, there is provided a computer-implemented method. The method includes registering an interface specification to an application, where metadata is associated with the interface specification. The method then includes routing a request to instances of the application based on the metadata associated with the interface specification for the application. The method then further includes combining one or more responses from the instances of the application to form an aggregate response based on the metadata associated with the interface specification for the application.

According to yet another aspect of the invention, there is provided a system for controlling interaction with a scalable application. The system includes a registering unit configured to register an interface specification to an application, where metadata is associated with the interface specification. The system further includes a routing unit configured to route a request to instances of the application based on the metadata associated with the interface specification for the application. The system further includes a combining unit configured to combine one or more responses from the instances of the application to form an aggregate response based on the metadata associated with the interface specification for the application.

According to another aspect of the invention, there is provided a computer program product for controlling interaction with a scalable application. The computer program product includes a computer readable storage medium having program instructions embodied within, the program instructions executable by a processing unit to cause the processing unit to perform a method according to a proposed embodiment.

According to another aspect of the invention, there is provided a processing system including at least one processor and the computer program product according to an embodiment. The at least one processor is adapted to execute the computer program code of the computer program product.

BRIEF DESCRIPTION OF THE DRAWINGS

Preferred embodiments of the present invention will now be described, by way of example only, with reference to the following drawings, in which.

DETAILED DESCRIPTION

Figure 1:
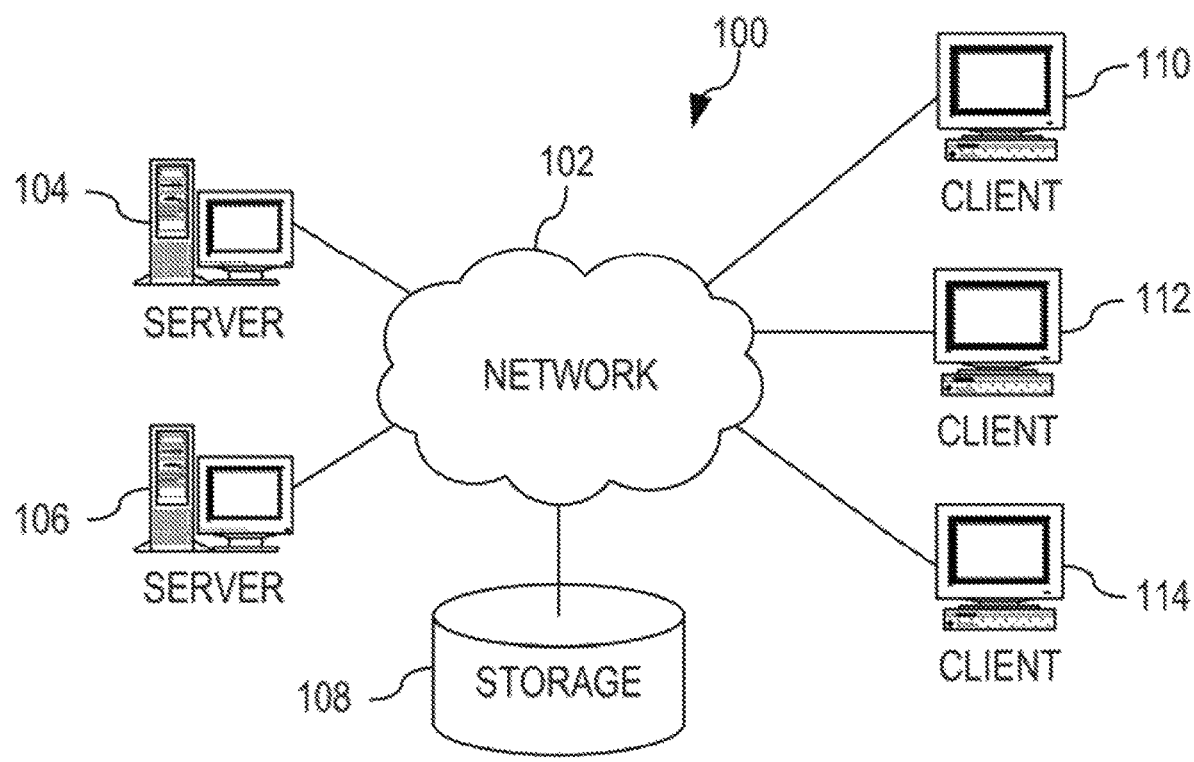
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Concepts for controlling interaction with a scalable application are proposed. Scalability in the context of cloud computing may be regarded as the ability to handle growing or diminishing resources to meet traffic demands in a capable way. In essence, scalability may provide a level of capacity that can grow or shrink as required.

Such concepts may involve a concept of registering an interface specification to an application, wherein metadata is associated with the interface specification. The metadata may be annotations on the interface specification that are either created manually by a user or generated automatically using a machine-learning algorithm. A developer or engineer may create the interface specification, including the metadata annotations. Metadata may be incorporated based on the type of expected request (PUT, GET, POST, etc.) or a basic set of metadata may be included if expected requests are not known. The metadata may provide an indication that the routing (i.e. the coordination/management) of a request and/or a response should be treated differently or in a particular manner. For instance, for the case of a command (i.e. a request) to enable tracing of an application, the annotations (i.e. the metadata) indicate that the request should be sent to all instances of the application, rather than just one instance. The interface specification may be registered with the platform technology (i.e. a multi-cloud application platform) on deployment, and the platform may own/host a routing unit (i.e. a routing component) in front of the instances of the application. In this way, the requests may be distributed by the routing unit to each of the corresponding instances of the application outlined by the interface specification.

Embodiments may be implemented in conjunction with an interface specification. The interface specification can also be referred to as an interface document, API (application programming interface) document, UI (user interface) specification, or Swagger document, and may include a specification or description for the application adhering to a standardized framework. The interface specification may capture the details of the software user interface into a written document and cover all possible actions that an end user may perform via the application, as well as all visual, auditory and other interaction elements in the application. The interface specification may thus be the main source of implementation/integration information for how the application should work. Beyond implementation, the interface specification may consider usability, localization, and demo limits. In general, the goal of a requirement specification may be to describe what a product (i.e. an application) is capable of, whereas the interface specification may detail how these requirements are implemented in practice. For example, a Swagger® document (or a Swagger® specification) is a specification for machine-readable interface files for describing, producing, consuming, and visualizing RESTful (representational state transfer) web services (i.e. applications), and documenting RESTful API. Swagger® is a registered trademark of NutraClick, LLC. Representational state transfer is a software architectural style that defines a set of constraints to be used for creating web services. Web services that conform to the REST architectural style (i.e. RESTful web services) provide interoperability between computer systems on the Internet. A RESTful API is an application programming interface that uses HTTP requests to enable two or more applications to communicate with each other.

Proposed embodiments may employ a concept of invoking commands (i.e. requests) over RESTful interfaces to be routed to and completed by all instances (or a selection of the instances) of an application. How the commands are invoked may be based on metadata associated with an interface specification for the application.

Accordingly, the inventors propose the provision of a routing unit (i.e. a routing component). Such a routing unit may be configured to route a request to instances of the application based on the metadata associated with the interface specification for the application. When a request is made and provided to the application, it may be first processed by the routing unit, where the registered interface specification may be analyzed and the request subsequently routed according to the associated metadata. The corresponding responses can then be cached (i.e. stored) by the routing unit and then returned to the calling application in a manner defined by the application programming interface. The routing unit may be configured with appropriate retry logic in case of temporary errors when making and aggregating responses.

Embodiments may thus facilitate management or routing and coordination of requests to a scalable application. Requests may be routed to all instances of the running application based on the metadata associated with the interface specification (i.e. the API document) for the application. In some embodiments, requests may be routed to a predefined selection of the instances of the application. Based on the associated metadata, the responses may then be aggregated from application instances to form a single response for the client.

In some embodiments, the interface specification for the application may include instructions relating to an interaction and/or integration with an application interface associated with the application. In this way, the details of a software user interface (e.g. implementation information for an Application Program Interface) may be captured, enabling machines/users that will interact and/or integrate with the application interface to have improved access to the specification. As a result, machines/users that interact with the application may have access to all possible actions that an end user may perform when implementing the application, as well as all visual, auditory, and other interaction elements. Consequently, the ease of communication between the application and the interacting machine/user may be improved.

In some embodiments, the metadata may include instructions relating to an interaction with the request and/or the one or more responses. In this way, information relating to how a request and/or a response should be handled may be provided to a router component (e.g. a workload balancer). As such, clear instructions on managing the routing of requests and/or responses to instances of an application may be provided, which may improve the efficiency of the request/response coordination. Further, this may enable specific requests to be distributed to a plurality of instances of an application. This may include all instances of an application or a fraction/selection of instances of an application. As a result, the risk of not completing a request due to overlooking or missing a specific instance of an application may be reduced in an efficient manner.

In a proposed embodiment, registering an interface specification to an application may include creating the metadata, then associating the created metadata with the interface specification. The step may then include registering the interface specification to the application. In this way, the metadata may be created manually by a user or it may be generated automatically using machine learning algorithms. As a result, the information relating to the interaction and/or integration for an application may be specifically tailored (e.g. by a user) for a predefined purpose. This may enable improved control and coordination in managing the interaction with the application.

In a proposed embodiment, routing the request to instances of the application may include analyzing the registered interface specification for the application. The step may then include identifying the metadata associated with the analyzed interface specification. The step may further include routing the request to the instances of the application based on the identified metadata associated with the analyzed interface specification. In this way, managing the routing of requests may be improved, which may enable an improved ease of control in coordinating interaction with the scalable application. Consequently, routing for each request may be tailored to requirements defined by a user for the application, which may improve the versatility and usability of the interface specification. As a result, the need for intelligently distributing traffic across instances by assessing each instance may be mitigated, which may reduce the processing time required, thus improving efficiency.

In a proposed embodiment, combining the one or more responses from the instances of the application to form an aggregate response may include receiving the one or more responses from the instances of the application, wherein the one or more responses are associated with the routed request. The step may then include storing the one or more received responses, then combining the one or more stored responses to form an aggregate response. In this way, the resulting aggregate response may provide information relating to the one or more combined responses to the user with improved clarity. For example, the aggregate response may include information relating to the degree of success of the request for each instance of the application it was routed to. In this way, the user may have improved visibility regarding the interaction and/or integration between the application and a multi-cloud application platform. Consequently, any possible errors or request failures may be identified and resolved with an improved efficiency and reliability. Thus, the risk of overlooking an error in the interaction with the application is reduced.

In some embodiments, the request may include a command to be performed on the instances of the application. Examples of the command include, but are not limited to, a command to identify and/or resolve errors in the instances of the application (e.g. TRACE HTTP request), a command to receive a status notification comprising a status of the instances of the application (e.g. STATUS HTTP request), a command to retrieve information from the instance of the application (e.g. GET HTTP request), a command to send data to the application, for example customer information, file upload, etc. (e.g. POST HTTP request), a command to remove predefined information (e.g. DELETE HTTP request), a command to establish a communication flow with the application (e.g. CONNECT HTTP request), a command to describe the communication options for the application (e.g. OPTIONS HTTP request). In this way, the versatility of the interaction with the application and its instances may be improved, which may enable an improved management of the interaction with the application.

In some embodiments, the application may be located in a scalable cloud environment. In this way, the instructions provided by the metadata on how to handle the requests and/or responses may be generated based on a planned level of capacity for the application that can grow or shrink as needed. As a result, the risk of the application crashing (or even slowing down) due to increased traffic may be mitigated.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. The distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
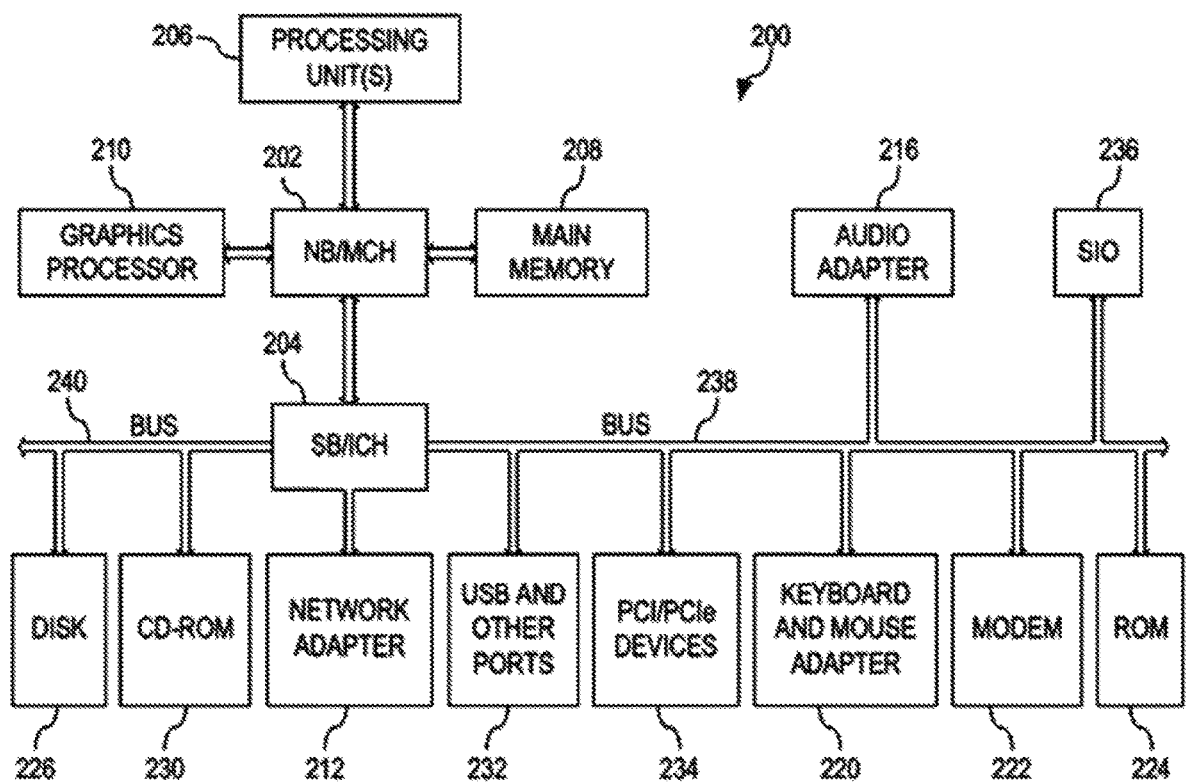
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement a registering unit, a routing unit, and a combining unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java® programming system, may run in conjunction with the operating system and provides calls to the operating system from Java® programs or applications executing on system 200. Java® is a registered trademark of Oracle or its affiliates.

As a server, system 200 may be, for example, an IBM™ eServer™ System p™ computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM™, eServer™, and System p™ are trademarks of International Business Machines Corporation. AIX® is a registered trademark of International Business Machines Corporation. LINUX® is a registered trademark of Linus Torvalds.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may include one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
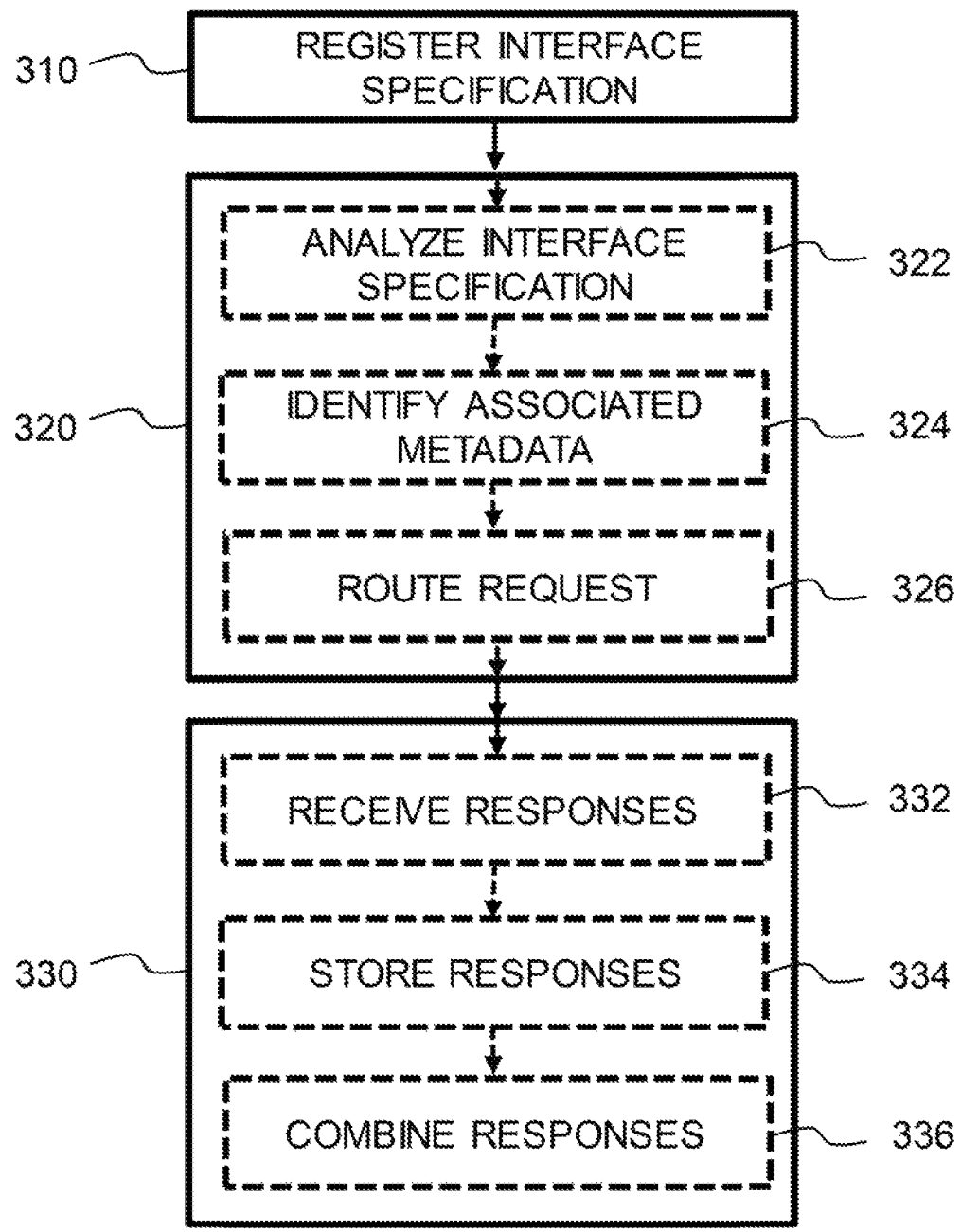
FIG. 3 is a flow diagram of a computer-implemented method for controlling interaction with a scalable application.

Referring now to FIG. 3, there is depicted a flow diagram of a computer-implemented method for controlling interaction with a scalable application.

Step 310 includes registering an interface specification to an application, wherein metadata is associated with the interface specification. For example, the application has an associated Swagger® document (i.e. an interface specification) in a predefined location. In the example, the application is deployed to an open source, multi-cloud application platform that provides routing and scaling capabilities (which are already widely known and available).

In an embodiment, the interface specification for the application includes instructions relating to an interaction and/or integration with an application interface associated with the application. For example, the interface specification includes a Swagger® document and/or an API document.

In an embodiment, the metadata includes instructions relating to an interaction with the request and/or the one or more responses. In the example, the interface specification (i.e. the Swagger® document) includes metadata on the/v1/startTrace API to indicate requests should be fanned out to all instances (i.e. distributed concurrently to all instances) and responses should be subsequently aggregated. An example of the metadata associated with the interface specification is as follows:

```
paths:
  /v1/startTrace:
    get:
      operationId: "startTrace"
      summary: "Instruct the server to start tracing\n"
      description: "Returns a successful response code if the
      server starts trace\n"
      routing:
        request: "all-instances"
        response: "aggregate"
      responses:
        200:
          description: "OK"
        503:
          description: "Unavailable"
```

In the example, the API document (i.e. the interface specification) is registered (i.e. associated or linked) with the application platform, specifically a router component of the application platform.

By way of example, registering an interface specification to an application includes steps 312, 314, and 316. Step 312 includes creating the metadata. Step 314 includes associating the created metadata with the interface specification. Step 316 includes registering the interface specification to the application.

Step 320 includes routing a request to instances of the application based on the metadata associated with the interface specification for the application.

In an embodiment, routing the request to instances of the application includes steps 322, 324, and 326. Step 322 includes analyzing the registered interface specification for the application. Step 324 includes identifying the metadata associated with the analyzed interface specification. Step 326 routing the request to the instances of the application based on the identified metadata associated with the analyzed interface specification.

In the example, an issue is identified in the application and a trace is required. In response, the user issues a command (i.e. a request) via a RESTful API (Representational State Transfer Application Program Interface) to start a trace. A RESTful API is an application program interface that uses HTTP requests to GET, PUT, POST, and DELETE data. The request (i.e. the command) is sent to the route component of the application platform, where the Swagger® document (i.e. the interface specification) is inspected. Consequently, the request is routed to all instances of the application as the metadata describes, instead of just routing to one instance.

In an embodiment, the request includes a command to be performed on the instances of the application. In the example, the request (i.e. the command) to start a trace is used (/v1/startTrace), however other requests can be implemented. Examples of such requests include, but are not limited to, a stop trace request (/v1/stopTrace), a request to return a combination of status objects from each instance (GET/v1/status), and a request to return a confirmation relating to whether each instance is ready (GET/v1/already, where a 204 HTTP status code is returned if all instances are ready and a 503 HTTP status code is returned if one instance is not yet ready).

Step 330 includes combining one or more responses from the instances of the application to form an aggregate response based on the metadata associated with the interface specification for the application.

In an embodiment, combining the one or more responses from the instances of the application to form an aggregate response includes steps 332, 334, and 336. Step 332 includes receiving the one or more responses from the instances of the application, wherein the one or more responses are associated with the routed request. Step 334 includes storing the one or more received responses. Step 336 includes combining the one or more stored responses to form an aggregate response.

In the example, each instance of the application receives the request (i.e. the command to start a trace). Each instance processes the requests successfully and sends a HTTP 200 OK success state response code (i.e. a response) to acknowledge the request has succeeded and that the trace has started. A router component (i.e. a routing unit) of the application platform waits for responses from all instances that the request was routed to, then aggregates (i.e. combines) each of the received responses into a single response (i.e. an aggregate response) for the client application. For example, all responses are aggregated into an array. If all responses are identical (e.g. each response includes a HTTP status code 204, i.e. the application/server has successfully fulfilled the request and there is no additional content to send in the response payload body), then the single aggregate response includes a single HTTP status code 204. In another example, if one response includes a HTTP status code 500 (i.e. the application/server encountered an unexpected condition that prevented it from fulfilling the request) and the rest of the responses include HTTP status code 204, then the single aggregate response includes a HTTP status code 500 and an identifier to indicate the instance of the application that In an example, the router component (i.e. the routing unit) is configured with appropriate retry logic in case of temporary errors when creating and aggregating the responses. An example of the aggregate response is as follows:

HTTP Status Code: 200
[
{"tracing started for server instance 0001"},
{"tracing started for server instance 0002"},
{"tracing started for server instance 0003"},
{"tracing started for server instance 0004"},
{"tracing started for server instance 0005"}
]

In such an example, tracing has started on all instances of the application. Once the traces are complete, the trace logs can be retrieved and the event can be captured.

In an embodiment, the application is located in a scalable cloud environment.

Figure 4:
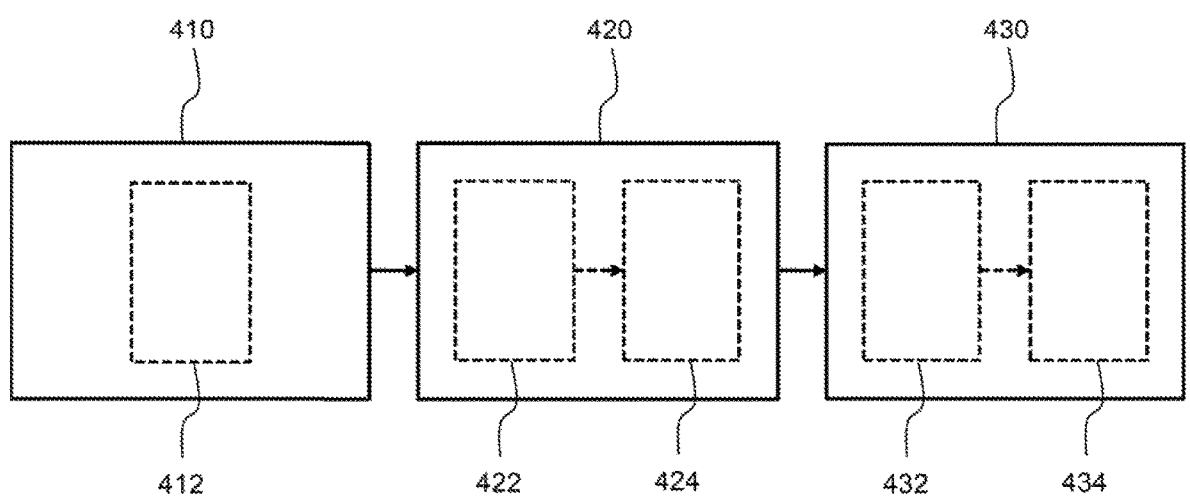
FIG. 4 is a simplified block diagram of an exemplary embodiment of a system for controlling interaction with a scalable application.

Referring now to FIG. 4, there is depicted a simplified block diagram of an exemplary embodiment of a system for controlling interaction with a scalable application.

The system includes a registering unit 410 configured to register an interface specification to an application, wherein metadata is associated with the interface specification. The system further includes a routing unit 420 configured to route a request to instances of the application based on the metadata associated with the interface specification for the application. The system further includes a combining unit 430 configured to combine one or more responses from the instances of the application to form an aggregate response based on the metadata associated with the interface specification for the application.

In an embodiment, the interface specification for the application includes instructions relating to an interaction and/or integration with an application interface associated with the application.

In an embodiment, the metadata includes instructions relating to an interaction with the request and/or the one or more responses.

In an embodiment, the registering unit 410 includes a creating unit 412 configured to create the metadata and to associate the created metadata with the interface specification. The registering unit 410 is configured to register the interface specification to the application.

In an embodiment, the routing unit 420 includes a processing unit 422 configured to analyze the registered interface specification for the application. The routing unit 420 further includes an identifying unit 424 configured to identify the metadata associated with the analyzed interface specification. The routing unit 420 is further configured to route the request to the instances of the application based on the identified metadata associated with the analyzed interface specification.

In an embodiment, the combining unit 430 includes a receiving unit 432 configured to receive the one or more responses from the instances of the application, wherein the one or more responses are associated with the routed request. The combining unit 430 further includes a storing unit 434 configured to store the one or more received responses. The combining unit 430 is further configured to combine the one or more stored responses to form an aggregate response.

In an embodiment, the request includes a command to be performed on the instances of the application.

In an embodiment, the application is located in a scalable cloud environment.

Figure 5:
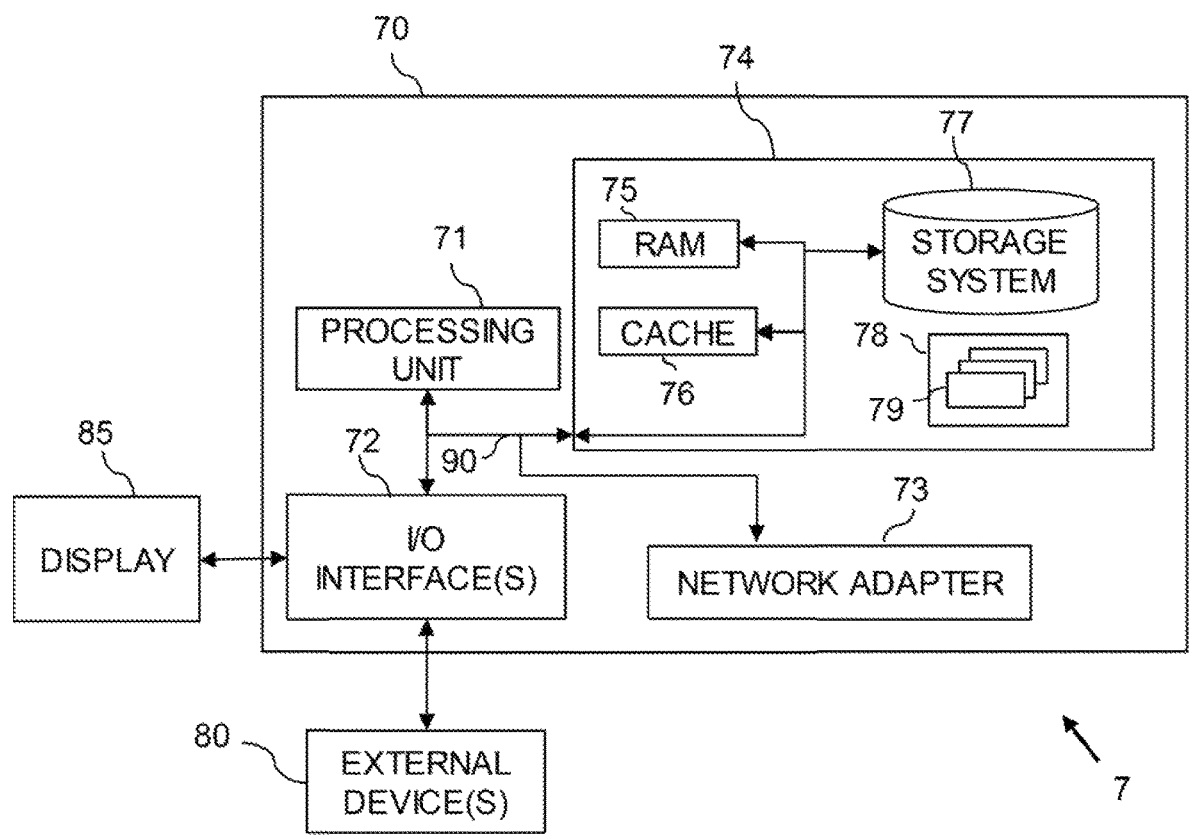
FIG. 5 is a simplified block diagram of an exemplary embodiment of a system for controlling interaction with a scalable application.

By way of further example, as illustrated in FIG. 5, embodiments may include a computer system 70, which may form part of a networked system 7. For instance, a routing unit may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for controlling interaction with a scalable application according to a proposed embodiment.

Program/utility 78, having a set (at least one) of program modules 79, may be stored in memory 74. Program modules 79 generally carry out the functions and/or methodologies of proposed embodiments for controlling interaction with a scalable application.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Figure 6:
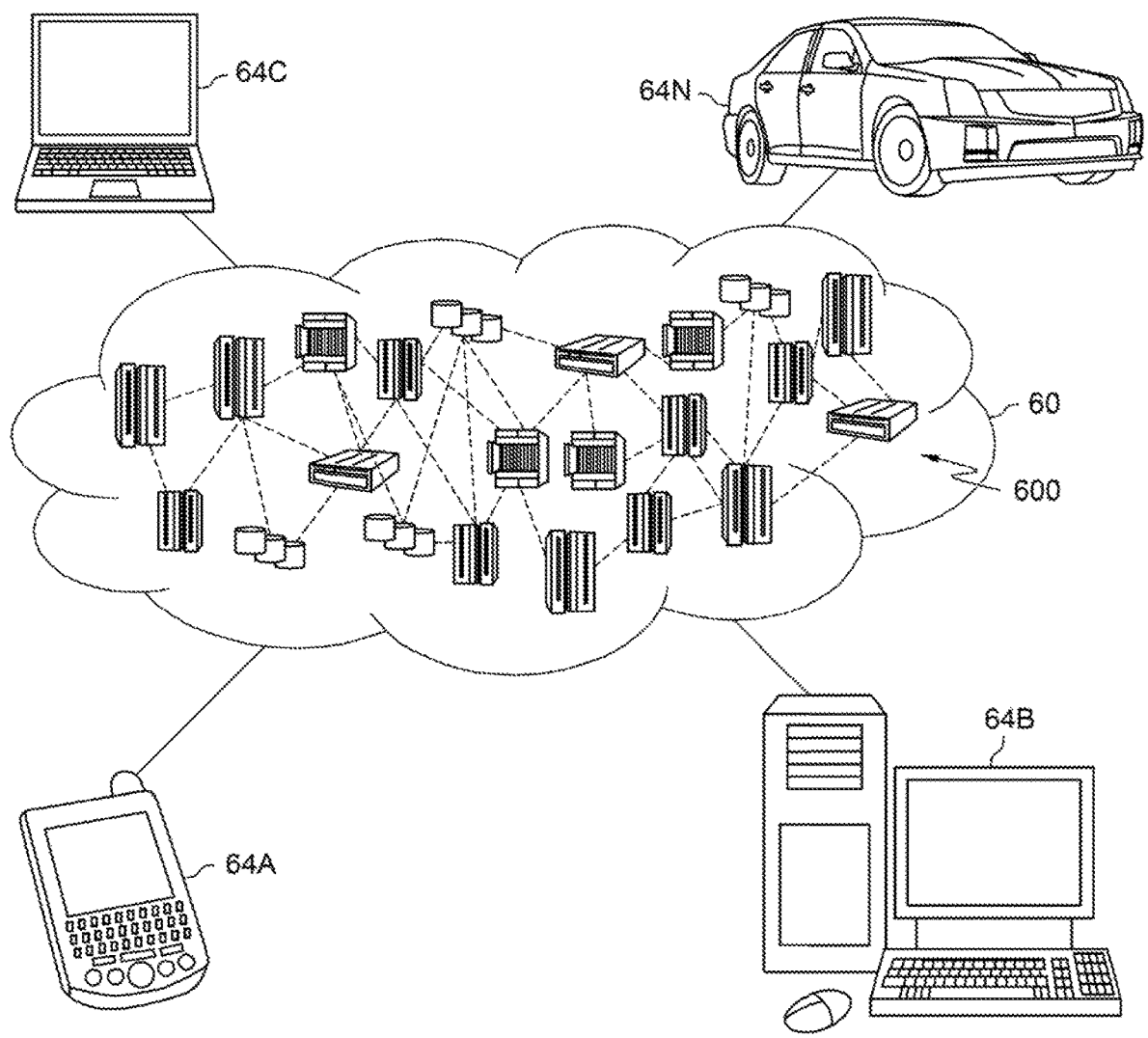
FIG. 6 depicts a cloud computing environment according to an embodiment of the present invention.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 640A, desktop computer 640B, laptop computer 640C, and/or automobile computer system 640N may communicate. Cloud computing nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640A-N shown in FIG. 6 are intended to be illustrative only and that cloud computing nodes 610 and cloud computing environment 600 can communicate with any type of computerized device over any type of network and/or network addressable connection (e.g., using a web browser).

Figure 7:
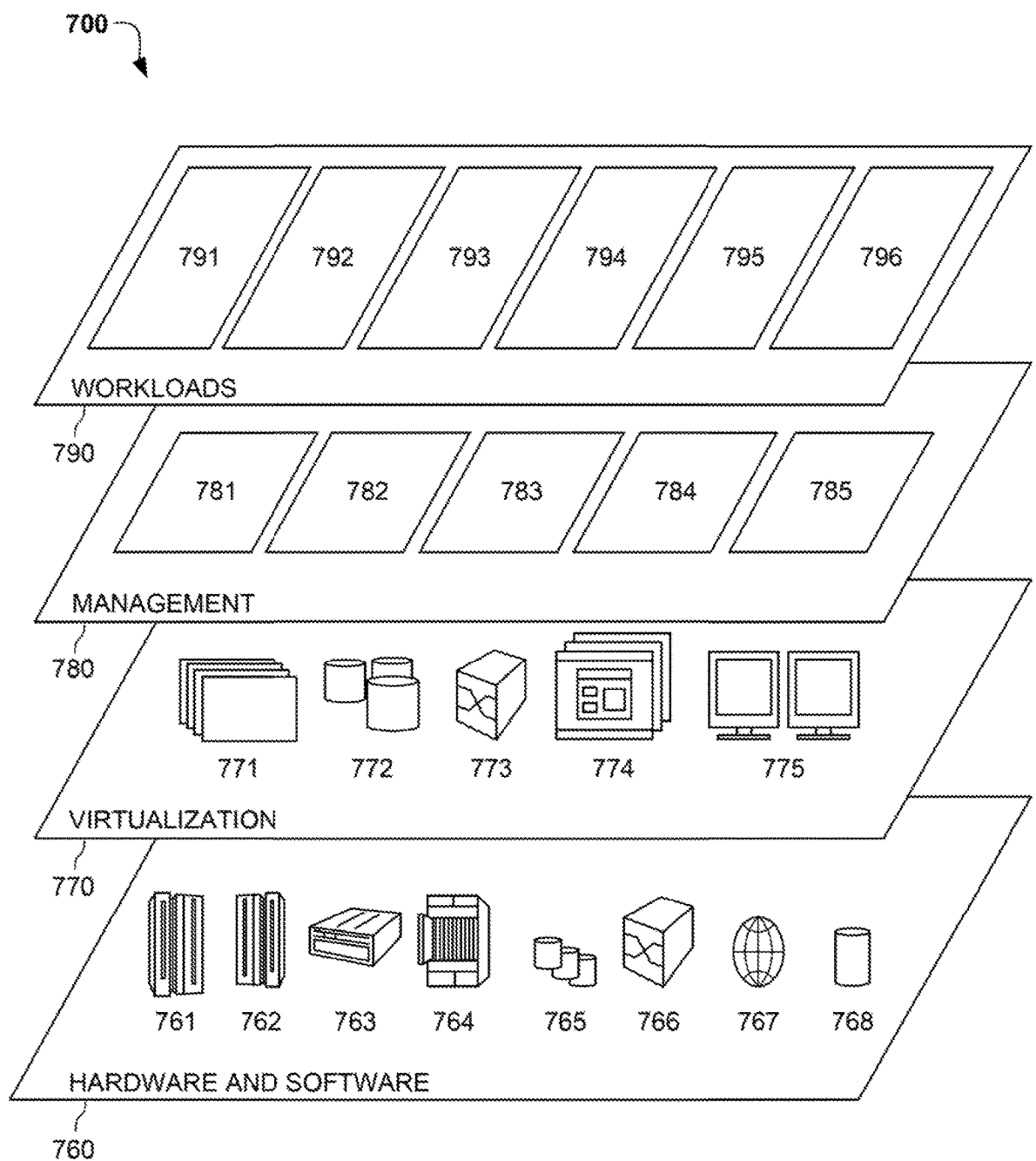
FIG. 7 depicts abstraction model layers according to an embodiment of the present invention.

Referring now to FIG. 7, a set of functional abstraction layers provided by cloud computing environment 600 (as shown in FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772, for example the system memory 74 as shown in FIG. 5; virtual networks 773, including virtual private networks; virtual applications and operating systems 774; and virtual clients 775.

In an example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and log file management program 796. The log program 796 may control interaction with a scalable application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for controlling interaction with a scalable application, the method comprising:
    registering an interface specification to the scalable application, wherein metadata is associated with the interface specification, wherein there are two or more independent instances of the scalable application, each of which can be deployed and scaled independently of other instances, wherein each of the two or more independent instances are each independently available to a user on demand via the internet from a unique independent cloud computing provider's server;
    routing a request to perform a trace command to each of the two or more independent instances of the scalable application based on the metadata associated with the interface specification for the scalable application, wherein the associated metadata specifies the routing request is to be sent to each of the two or more independent instances of the scalable application based on a corresponding requirement defined by a user of each of the two or more independent instances of the scalable application; and
    combining two or more responses from each of the independent instances of the scalable application to form an aggregate response based on the metadata associated with the interface specification for the scalable application by:
        receiving the two or more responses from each of the two or more independent instances of the scalable application, wherein the two or more responses are associated with the routed request to perform the trace command, wherein each of the two or more responses identify a specific instance of each of the two or more independent instances of the scalable application,
        storing the two or more received responses, and
        combining the two or more stored responses to form the aggregate response by combining identical responses and identifying each specific instance of each of the two or more independent instances with a non-identical response.

2. The method of claim 1, wherein the interface specification for the scalable application comprises instructions relating to an interaction and integration with an application interface associated with the scalable application.

3. The method of claim 1, wherein the metadata comprises instructions relating to an interaction with the request and the two or more responses.

4. The method of claim 1, wherein registering the interface specification to the scalable application comprises:
    creating the metadata;
    associating the created metadata with the interface specification; and
    registering the interface specification to the scalable application.

5. The method of claim 1, wherein routing the request to the instances of the scalable application comprises:
    analyzing the registered interface specification for the scalable application;
    identifying the metadata associated with the analyzed interface specification; and
    routing the request to the instances of the scalable application based on the identified metadata associated with the analyzed interface specification.

6. The method of claim 1, wherein the request comprises a command to be performed on the instances of the scalable application.

7. The method of claim 1, wherein the scalable application is located in a scalable cloud environment.

8. A system for controlling interaction with a scalable application, the system comprising:
    one or more computer processors, one or more computer-readable storage media, and program instructions stored on the one or more computer-readable storage media for execution by at least one of the one or more computer processors, the system programed to:
    register an interface specification to the scalable application, wherein metadata is associated with the interface specification, wherein there are two or more independent instances of the scalable application, each of which can be deployed and scaled independently of other instances, wherein each of the two or more independent instances are each independently available to a user on demand via the internet from a unique independent cloud computing provider's server;
    route a request to perform a trace command to each of the two or more independent instances of the scalable application based on the metadata associated with the interface specification for the scalable application, wherein the associated metadata specifies the routing request is to be sent to each of the two or more independent instances of the scalable application based on a corresponding requirement defined by a user of each of the two or more independent instances of the scalable application; and
    combine two or more responses from each of two or more independent instances of the scalable application to form an aggregate response based on the metadata associated with the interface specification for the scalable application by:
        receiving the two or more responses from each of the two or more independent instances of the scalable application, wherein the two or more responses are associated with the routed request to perform a trace command, wherein each of the two or more responses identify a specific instance of each of the two or more independent instances of the scalable application,
        storing the two or more received responses, and
        combining the two or more stored responses to form the aggregate response by combining identical responses and identifying each specific instance of each of the two or more independent instances with a non-identical response.

9. The system of claim 8, wherein the interface specification for the scalable application comprises instructions relating to an interaction and integration with an application interface associated with the scalable application.

10. The system of claim 8, wherein the metadata comprises instructions relating to an interaction with the request and the two or more responses.

11. The system of claim 8, wherein registering the interface specification comprises:
creating the metadata;
associating the created metadata with the interface specification; and
registering the interface specification to the scalable application.

12. The system of claim 8, wherein routing the request to the instances of the scalable application comprises:
analyzing the registered interface specification for the scalable application;
identifying the metadata associated with the analyzed interface specification; and
routing the request to the instances of the scalable application based on the identified metadata associated with the analyzed interface specification.

13. The system of claim 8, wherein the request comprises a command to be performed on the instances of the scalable application.

14. The system of claim 8, wherein the scalable application is located in a scalable cloud environment.

15. A computer program product for controlling interaction with a scalable application, the computer program product comprising:
one or more computer-readable storage media and program instructions stored on the one or more computer-readable storage media, the program instructions executable by a computing system to cause the computing system to perform a method comprising:
registering an interface specification to the scalable application, wherein metadata is associated with the interface specification, wherein there are two or more independent instances of the scalable application, each of which can be deployed and scaled independently of other instances, wherein each of the two or more independent instances are each independently available to a user on demand via the internet from a unique independent cloud computing provider's server;
routing a request to perform a trace command to each of the two or more independent instances of the scalable application, based on the metadata associated with the interface specification for the scalable application, wherein the associated metadata specifies the routing request is to be sent to each of the two or more independent instances of the scalable application based on a corresponding requirement defined by a user of each of the two or more independent instances of the scalable application; and
combining two or more responses from each of the two or more independent instances of the scalable application to form an aggregate response based on the metadata associated with the interface specification for the scalable application by:
receiving the two or more responses from each of the two or more independent instances of the scalable application, wherein the two or more responses are associated with the routed request to perform a trace command, wherein each of the two or more responses identify a specific instance of each of the two or more independent instances of the scalable application,
storing the two or more received responses, and
combining the two or more stored responses to form the aggregate response by combining identical responses and identifying each specific instance of each of the two or more independent instances with a non-identical response.

16. The computer program product of claim 15, wherein the interface specification for the scalable application comprises instructions relating to an interaction and integration with an application interface associated with the scalable application.

17. The computer program product of claim 15, wherein the metadata comprises instructions relating to an interaction with the request and the two or more responses.

18. The computer program product of claim 15, wherein registering the interface specification to the scalable application comprises:
creating the metadata;
associating the created metadata with the interface specification; and
registering the interface specification to the scalable application.

19. The computer program product of claim 15, wherein routing the request to the instances of the scalable application comprises:
analyzing the registered interface specification for the scalable application;
identifying the metadata associated with the analyzed interface specification; and
routing the request to the instances of the scalable application based on the identified metadata associated with the analyzed interface specification.

20. The computer program product of claim 15, wherein the request comprises a command to be performed on the instances of the scalable application.

* * * * *